(12) United States Patent
Viasnoff

(10) Patent No.: US 9,248,472 B2
(45) Date of Patent: Feb. 2, 2016

(54) THIN FILMS WITH HIGH NEAR-INFRARED REFLECTIVITY DEPOSITED ON CONSTRUCTION MATERIAL GRANULES

(75) Inventor: Emilie Viasnoff, Meylan (FR)

(73) Assignee: CERTAINTEED CORPORATION, Valley Forge, PA (US)

( * ) Notice: Subject to any disclaimer, the term of this patent is extended or adjusted under 35 U.S.C. 154(b) by 272 days.

(21) Appl. No.: 13/269,767

(22) Filed: Oct. 10, 2011

(65) Prior Publication Data

US 2013/0089741 A1 Apr. 11, 2013

(51) Int. Cl.

| | |
|---|---|
| B32B 5/16 | (2006.01) |
| B05D 7/00 | (2006.01) |
| E04D 1/22 | (2006.01) |
| C04B 35/00 | (2006.01) |
| E04D 1/20 | (2006.01) |
| E04D 7/00 | (2006.01) |
| C04B 35/628 | (2006.01) |
| C04B 20/10 | (2006.01) |
| B32B 37/24 | (2006.01) |
| E04D 1/00 | (2006.01) |
| C04B 111/00 | (2006.01) |
| C04B 111/80 | (2006.01) |

(52) U.S. Cl.
CPC .............. B05D 7/00 (2013.01); C04B 20/1066 (2013.01); C04B 35/00 (2013.01); C04B 35/62821 (2013.01); C04B 35/62897 (2013.01); E04D 1/20 (2013.01); E04D 1/22 (2013.01); E04D 7/005 (2013.01); *B32B 2037/243* (2013.01); *C04B 2111/00586* (2013.01); *C04B 2111/80* (2013.01); *C04B 2235/3217* (2013.01); *C04B 2235/349* (2013.01); *C04B 2235/3418* (2013.01); *C04B 2235/3463* (2013.01); *C04B 2235/528* (2013.01); *C04B 2235/5427* (2013.01); *C04B 2235/5445* (2013.01); *E04D 2001/005* (2013.01); *Y10T 428/265* (2015.01); *Y10T 428/2991* (2015.01)

(58) Field of Classification Search
CPC ...... B32B 5/16; B32B 2037/243; E04D 1/22; Y10T 428/265
USPC .......................................... 428/403, 332, 336
See application file for complete search history.

(56) References Cited

U.S. PATENT DOCUMENTS

| | | |
|---|---|---|
| 2,981,636 A | 4/1961 | Lodge et al. |
| 4,378,408 A | 3/1983 | Joedicke |
| 5,411,803 A | 5/1995 | George et al. |
| 5,723,516 A | 3/1998 | Bigham et al. |

(Continued)

FOREIGN PATENT DOCUMENTS

GB 2477932 8/2011

OTHER PUBLICATIONS

U.S. Appl. No. 13/101,838, filed May 5, 2011, Aguiar.

(Continued)

*Primary Examiner* — Holly Le
(74) *Attorney, Agent, or Firm* — David W. Anderson; Abel Law Group, LLP

(57) ABSTRACT

Disclosed are construction granules surmounted by at least one thin film having substantial reflectance of near-infrared radiation, substantial transmittal of radiation in the visible light range, and substantial emissivity in the medium-infrared range to render the granules energy-efficient and aesthetically pleasing. Also disclosed are related methods for fabrication of the construction granules.

19 Claims, 4 Drawing Sheets

(56) References Cited

U.S. PATENT DOCUMENTS

| | | |
|---|---|---|
| 7,592,066 B2 | 9/2009 | Shiao et al. |
| 8,277,943 B2 * | 10/2012 | Viasnoff et al. ............ 428/411.1 |
| 2005/0069707 A1 | 3/2005 | Tysoe et al. |
| 2006/0251807 A1 | 11/2006 | Hong et al. |
| 2008/0241472 A1 | 10/2008 | Shiao et al. |
| 2010/0047566 A1 * | 2/2010 | Viasnoff et al. ............... 428/336 |
| 2010/0151199 A1 | 6/2010 | Shiao et al. |
| 2012/0282471 A1 | 11/2012 | Aguiar |
| 2013/0089707 A1 | 4/2013 | Faure |

OTHER PUBLICATIONS

U.S. Appl. No. 13/269,692, filed Oct. 10, 2011, Faure.

* cited by examiner

THIN FILMS WITH HIGH NEAR-INFRARED REFLECTIVITY DEPOSITED ON CONSTRUCTION MATERIAL GRANULES

FIELD OF THE INVENTION

The present invention relates to the fields of construction material granules and of coatings capable of reflecting near-infrared radiation while transmitting radiation in the visible light spectrum.

BACKGROUND OF THE INVENTION

Sloped roofs are typically covered with mineral-surfaced asphalt shingles, such as those described in ASTM D225 ("Standard Specification for Asphalt Shingles (Organic Felt) Surfaced with Mineral Granules") or D3462 ("Standard Specification for Asphalt Shingles Made From Glass Felt and Surfaced with Mineral Granules"), to provide a water-shedding function while adding an aesthetically pleasing appearance to the roofs.

Such asphalt shingles are normally made from asphalt-impregnated fabrics. The shingles also typically include colored roofing granules to provide aesthetically pleasing coloration to the shingles as well as to impart strength and durability to the shingles. The roofing granules are typically also used in asphalt-based roofing articles to help protect the asphalt from the effects of incident ultraviolet radiation.

It is known in the art, however, that conventional roofing materials that include granules, such as the described asphaltic shingles, reflect little near-infrared ("NIR" radiation; $\lambda$=about 700 nm to about 2500 nm) radiation and consequently absorb substantial solar heat. This absorption increases with dark-colored shingles; while white-colored asphalt shingles may have a solar reflectance in the range of about 25% to about 35%, dark-colored asphalt shingles may have a solar reflectance of only about 5 to about 15%. This absorption of solar heat typically results in elevated temperatures in the environment surrounding the shingle.

This elevation in temperature in turn gives rise to so-called heat-island effects that increase the need for energy-consuming cooling systems to offset these heat-island effects. Heat-island effects caused by the solar heat absorption of a dark-colored roofing article can be significant—temperatures as high as 77° C. have been observed on the surface of black roofing shingles on a sunny day having an ambient temperature of only about 21° C.

Several efforts have been made to address the challenges created by the described heat-island effects. Some have proposed incorporation of application of white- or light-colored pigments or coatings directly to roofing articles to enhance the articles' reflectivity. Consumers of roofing materials, however, have shown a marked aesthetic preference for black or dark-colored roofing articles.

Others have proposed roofing articles or granules having metal flakes, such as aluminum flakes, adhered to their surfaces, to provide a radiation-reflective surface. Such approaches, however, impart reflectivity to the roofing article and are not aesthetically pleasing to consumers.

Some solutions to the heat-island problem include the use of infrared-reflective pigments, known in the art as "cool pigments," on roofing articles to provide the roofing articles with desired levels of color and of NIR reflectance. These "cool pigments," however, have certain drawbacks. First, dark-colored "cool pigments," while aesthetically desirable, are comparatively high in cost, present a limited solar reflectance and are not available in jet-black hues. Others have suggested to use of roofing articles having NIR-transparent pigments disposed atop a NIR-reflective substrate. These solutions, however, are also high cost and possess limited solar reflectance when manufactured in the dark hues typically preferred by consumers.

Accordingly, there is an ongoing need in the field for improved roofing granules that possess desirable NIR reflectance characteristics while also providing an aesthetically pleasing appearance and allowing for the construction of dark-colored roofing articles. There is also a related need for processes capable of producing such improved roofing granules.

SUMMARY OF THE INVENTION

In meeting the described challenges, the present invention first provides coated construction granules, a granule being partially surmounted by at least one thin film having a thickness in the range of from about 5 nm to about 5000 nm, the at least one thin film transmitting from about 5% to about 100% of radiation having a wavelength of between about 300 nm and about 700 nm, and the at least one thin film reflecting from about 1% to about 100% of radiation having a wavelength of between about 700 nm and about 2500 nm.

The present invention also provides methods of disposing a thin film onto granules, comprising introducing into a reactor vessel at least one population of granules and at least one film-forming material, modulating the conditions within the reactor vessel so as to suspend at least a portion of the population of granules within the reactor vessel; and processing the at least one film-forming material so to give rise to a thin film of a thickness of between about 5 nm to about 5000 nm being disposed on one or more granules, the thin film being capable of transmitting from about 5% to about 100% of radiation having a wavelength of between about 300 nm and about 700 nm, being capable of reflecting from about 1% to about 100% of radiation having a wavelength of between about 700 nm and about 2500 nm.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
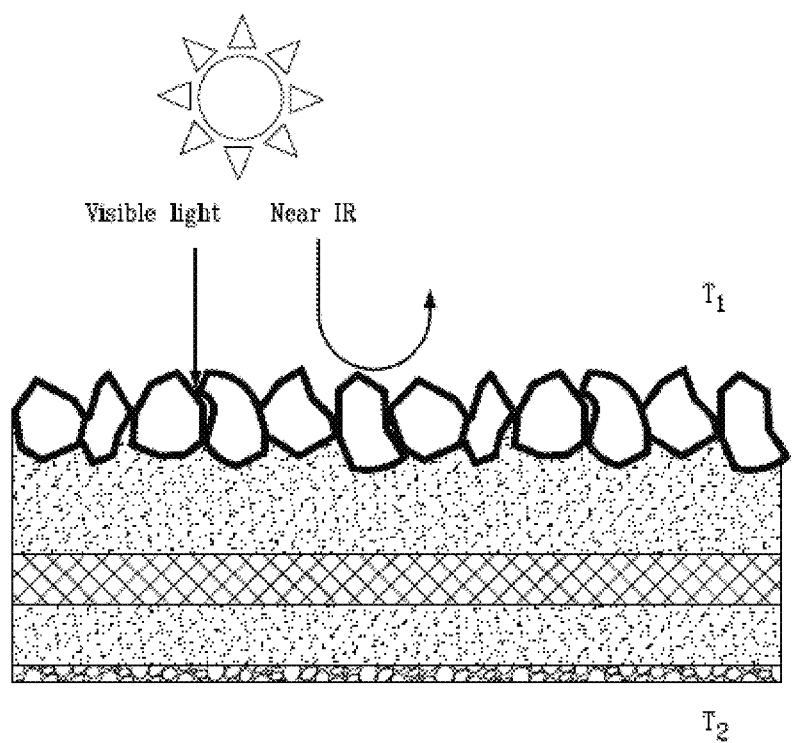
FIG. 1 depicts a schematic view of the operation of the disclosed construction granules.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range. Publications cited herein are incorporated by reference in their entireties.

The present invention first provides coated construction granules. Such granules are suitably surmounted by at least one thin film having a thickness in the range of from about 5 nm to about 5000 nm. The thin films suitably transmit from about 5% to about 100% of radiation having a wavelength of between about 300 nm and about 700 nm, and reflect from about 1% to about 100% of radiation having a wavelength of between about 700 nm and about 2500 nm. The coated granules also suitably have an emissivity of from about 75% to about 100% in the medium-IR (i.e., $\lambda > 2.5$ μm) range, from about 85% to 95%, or even about a 90% emissivity in that range.

The granules are suitably comprised of a chemically inert material. Such materials include, inter alia, talc, slag, granite, silica sand, greenstone, andesite, porphyry, marble, syenite, rhyolite, diabase, greystone, quartz, slate, trap rock, basalt, a marine shell, a proppant body, crushed brick, concrete, porcelain, fire clay, slate, feldspathic rock, plagioclase rock, chert rock, aluminum oxide, mullite, ceramic grog, crushed porcelain, white-pigmented glass, copper, zinc, and the like. Granules may be made of mixtures of two or more of these materials. Other suitable materials will be known to those of ordinary skill in the art.

Granules suitably have a characteristic dimension in the range of from about 200 microns to about 3 mm, and are also suitably between about #8 U.S. mesh and #70 U.S. mesh, and more preferably with sizes ranging from #8 U.S. mesh to #40 U.S. mesh. The granules may also be characterized as having an average particle size in the range of from about 0.2 mm to about 3 mm, and more preferably in the range of from about 0.4 mm to about 2.4 mm.

The granules may be of essentially any shape or cross-section. Spherical granules are considered suitable, as are plate-shaped and cubic granules. The granules may be of regular or irregular shape, and pitted, roughened, or other non-uniform granules are all suitable. The population of granules used on a particular roofing or building article may be monodisperse or polydisperse in terms of size. Mixtures of granules having different thin film coatings may also be used for a given building article or material. A construction article according to the present invention may thus include a mixture or blend of thin-film coated granules.

The thin films of the disclosed granules are suitably from about 10 nm to about 1000 nm in thickness. In some embodiments, the films are from about 20 nm to about 500 nm in thickness, or even from about 50 nm to about 200 nm in thickness.

The thin films also suitably transmit from about 25% to about 100% of radiation having a wavelength of between about 300 nm and about 700 nm, or even from about 50% to about 100% of radiation having a wavelength of between about 300 nm and about 700 nm. In some embodiments, the thin films are essentially transparent to visible light.

In some embodiments, the at least one thin film transmits radiation having a wavelength of between about 300 nm and about 700 nm essentially uniformly across the range of wavelengths between about 300 nm and about 700 nm. As one non-limiting example, such a thin film according to the present invention transmits radiation having a wavelength of about 350 nm at the same level as radiation having a wavelength of about 550 nm. In some embodiments, construction granules of multiple colors display those colors evenly, such that no granule of one color appears richer or more intense than granules of other colors. In other embodiments, the thin films transmit radiation having a wavelength of between about 300 nm and about 700 nm non-uniformly. The thin films may also be chosen such that the thin films and the granules themselves are similar or even identical in color to one another.

The thin films of the present granules also suitably reflect from about 1% to about 100% of NIR radiation. In some embodiments, the thin films reflect from about 10% to about 80% of NIR radiation, or even from about 30% to about 70% of NIR radiation. The claimed granules preferably reflect at least about 50% of NIR radiation.

The coated granules also have an emissivity of from about 75% to about 100%, or from 85% to about 95%, or even about 90%, for radiation in the medium-IR ($\lambda > 2.5$ μm) range. The coated granules preferably have an emissivity of about 90% or greater, which emissivity ameliorates the "heat island" effect that arises when construction materials are heated by sunlight and retain some of that heat, which heat retention results in the material being hotter than its surroundings.

The operation of the disclosed granules is shown in FIG. 1. As shown in that figure, visible light and NIR radiation impact a layer of construction granules made according to the claimed invention. The thin film coating of the granules reflects at least a portion of the NIR radiation. This reflectance of NIR radiation in turn at least partially avoids the heat island effect caused by absorption of NIR radiation, as described elsewhere herein.

The granules shown in FIG. 1 additionally transmit at least a portion of radiation in the visible light range, i.e., radiation in the wavelength of from about 300 nm to about 700 nm. This transmission of visible light in turn enables one observing the granules and construction article to perceive the underlying color or colors of the granules. Such underlying color is suitably black, brown or another color that is aesthetically pleasing to consumers; dark colors are considered particularly suitable. Granules disposed on a given construction article may all be of the same color or of different colors.

The net effect of the disclosed granules is to reduce the previously-described heat island effect. This is shown by FIG. 1, in which the temperature T2 on the roof-side of the construction article is lower than the temperature T1 on the environment-side of the construction article where the article is exposed to solar radiation.

Also as shown in the non-limiting embodiment of FIG. 1, the construction granules of the present invention are suitably disposed, as a layer, atop a base substrate material. That substrate material may itself be a single layer or be multilayered, and may include paint, sealants, and the like. In typical commercial embodiments, the substrate is a shingle or other roofing stock.

As used in the present specification and claims, L* is a description of the lightness of an article's color, as set forth in the 1976 CIELAB L* a* b* color space, wherein L*=0 signifies black and L*=100 indicates diffuse white, negative values of a* indicate green while positive values indicate magenta, and negative values of b* indicate blue and positive values of b* indicate yellow. Granules according to the present invention suitably have a thin film selected so as to provide a construction granule with an L* value of less than about 85, although in some embodiments, the thin film is selected so as to provide a construction granule with an L* value of less than about 65. The optimal L* for a particular granule will be dictated by the needs or preferences of the user.

The coated granules of the present invention are suitably disposed on standard construction substrate materials. Such materials include shingles, roofing membranes, shakes, tiles, coil stock, and the like. Methods for disposing or affixing granules to such substrate materials will be known to those of ordinary skill in the invention.

The thin films of the present invention may be comprised of various materials. The thin films are suitably constructed so as to achieve the desired reflection of NIR radiation while also being sufficiently thin to maintain the desired color of the construction granule.

High refractive index materials are also suitable for use in the thin films of the claimed granules. Such materials are typically chosen on the basis of the high optical index contrast between air and such materials. As non-limiting examples, $TiO_2$ and $Fe_2O_3$ are considered suitable high-index materials. $SnO_x$ with a non-stoichiometric loading of fluorine may also be used; other high-index materials will be apparent to those of ordinary skill in the art. Where desired, the thin film material may include a dopant, e.g., niobium. The dopant may be present in an amount sufficient to alter the doped material's characteristics as the user may desire. $TiO_2$ ($n_{anastase}$=2.55 at $\lambda$=590 nm; $n_{rutile}$=2.903 at $\lambda$=590 nm) is considered especially suitable, on the ground of its a particularly high refractive index. At some thicknesses, the $TiO_2$ is essentially transparent in visible light.

Suitable high-index materials include those materials having a refractive index of at least about 1.5 or even at least about 2. A number of metals, metal oxides, and minerals possess such an index and will be easily identified by those of ordinary skill in the art.

In some embodiments, the granules of the present invention include a sealant or adhesive. Such materials may be used to prevent or slow diffusion of the components of the thin film into the granule or to enhance incorporation of granules into construction articles such as shingles or construction membranes. In other embodiments, the granules include algaecidal agents, biocidal agents, antimicrobial agents, and the like. The thin films may also be chosen so as to have photocatalytic characteristics to enable, e.g., self-cleaning. The films may include a polymer or plastic as a matrix material or binder. The polymer or plastic may be transparent or nearly transparent, or, in some embodiments, may be chosen to impart a particular color to the film or granule.

A binder or sealer (e.g., adhesive, glue, polymer) may be used to secure the thin film to the granule, in some embodiments. In other embodiments, the film is cast directly onto the granule. The granules may include a outer coating disposed so as to encase the granule and thin film; the outer coating may comprise silicon, silicone, or even a polymer, such as PMMA and the like. The outer coating may also comprise a copolymer. In some embodiments, the granules are disposed atop a construction material that is then itself surmounted by a coating that may protect the material and granules or affix the granules to the material.

As described elsewhere herein, the granules of the present invention are typically disposed onto construction articles; roofing materials are considered especially suitable for use with the claimed granules. The granules may, however, also be disposed onto other building materials, including rails, decking, siding, fence materials, and the like. Suitable roofing articles include, inter alia, shingles, roofing membranes, shakes, tiles, coil stock, and the like. Granules made according to the present invention are used wherever conventional roofing granules are used.

Also disclosed are methods of disposing thin films onto granules. The methods suitably include introducing into a reactor vessel at least one population of granules and at least one film-forming material, modulating the conditions within the reactor vessel so as to suspend at least a portion of the population of granules within the reactor vessel; and processing the at least one film-forming material so to give rise to a thin film of a thickness of between about 5 nm to about 5000 nm being disposed on one or more granules. The thin films are suitably capable of transmitting from about 5% to about 100% of radiation having a wavelength of between about 300 nm and about 700 nm, and of reflecting from about 1% to about 100% of radiation having a wavelength of between about 700 nm and about 2500 nm. The methods are also suitably configured such that the resultant granules are capable of emitting of from about 75% to about 100% of absorbed energy in the medium-IR ($\lambda$>2.5 µm) range.

Suitable granule materials and sizes are described elsewhere herein; granules are preferably between about 0.4 mm to about 2.4 mm in size. As discussed, the granules are preferably chemically inert, and may be mineral in composition.

Film-forming materials suitably include at least one metal, although silicas, monomers, polymers, silicates, and the like are also suitable film-forming materials. The film-forming materials may be solid, liquid, or gaseous, and are typically applied in fluid form.

The conditions within the reactor vessel are suitably modulated to adjust the introduction of the at least one population of granules, the introduction of the at least one film-forming material, introducing a vector fluid into the reactor, and the like. The modulation also includes circulating the population of granules within the reactor vessel, and can also include reacting the film-forming material with one or more co-reactants.

Once the film-forming material is disposed on the granule, the material may be further processed by curing, heating, or drying, where needed, to give rise to a stable thin film. The processing may also include an oxidation or other treatment of material disposed on the surface of the granule. Such processing may occur within the reactor vessel, outside of the reactor vessel; or both. In some embodiments, there is a post-curing step used to enhance the mechanical properties of the thin film coating on the granule.

In some embodiments, at least a portion of the method is performed at greater than 200° C., or greater than about 400° C., or even greater than about 600° C. The optimal temperature at which the present methods are performed may be dictated by the materials involved, and will be apparent to the user of ordinary skill in the art.

Fluidized bed reactors are considered a particularly suitable method for disposing coatings on granules. In U.S. patent application Ser. No. 11/379,733 (published as US 2006/0252807A1), the entirety of which is incorporated herein by reference, Shiao et al., describe a method of coating granules by use of a fluidized bed reactor. The thin coatings of the present invention may be applied via a chemical vapor deposition ("CVD") process or by a sol-gel process, both of which processes are known in the art and may be used in a fluidized bed reactor system. Fluidized bed reactor schemes may be assisted by plasma or thermal energy.

Figure 2:
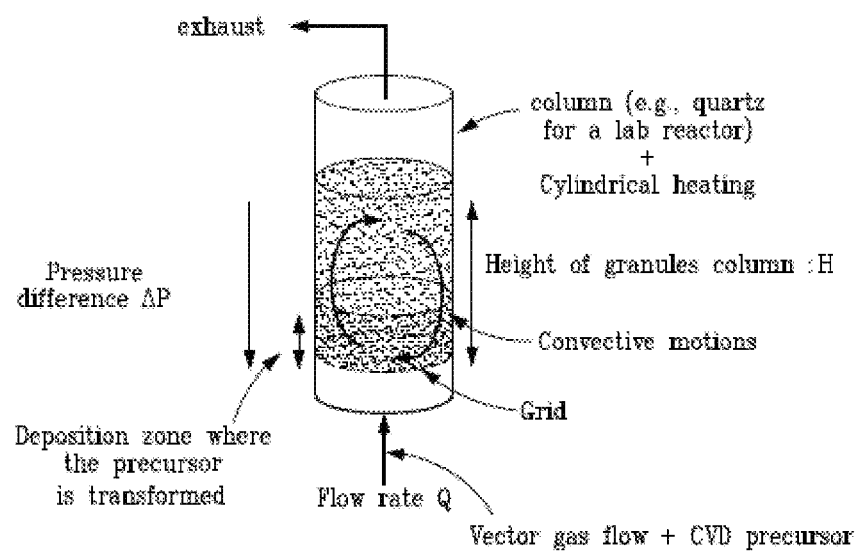
FIG. 2 is a schematic view of a process using chemical vapor deposition ("CVD") within a fluidized bed to dispose a thin film on construction granules.

A non-limiting depiction of a process for coating granules with thin films via a CVD process in a fluidized bed is shown in FIG. 2. In that figure, a CVD precursor material along with a vector gas is introduced at the bottom of the reactor. As is known in the field, the gas and precursor are suitably introduced at a flowrate capable of suspending the granules within the reactor. Once introduced into the reactor, the precursor material is rendered capable of film-forming and is contacted with convectively circulating granules. This contacting is done under such conditions that a thin film is formed on the surfaces of the circulating granules. The fluidized bed is suitably heated, and excess gas is removed from the top of the reactor.

The thickness and other characteristics of the coating depends upon a number of parameters. These parameters include the residence time of the particles in the device, the particle shape, the particle size distribution, the temperature of the suspending airflow, the temperature of the fluidized bed of particles, the pressure of the suspending airflow, the pressure of the atomizing air, the composition of the coating material, the size of the droplets of coating material, the size of the droplets of coating material relative to the size of the particles to be coated, the spreadability of the droplets of coating material on the surface of the particles to be coated, the loading of the device with the mineral particles or batch size, the viscosity of the coating material, the physical dimensions of the device, and the spray rate. The optimal combination of parameters to achieve a particular thin film coating will be easily determined by the user of ordinary skill. Processes for coating non-spherical or asymmetric granules are also known, and methods for improving the coating of such granules, such as those set forth in U.S. Patent Publication 2005/0069707 (the entirety of which is incorporated herein by reference), can also be employed.

The thin films disposed according to the disclosed methods are suitably capable of transmitting from about 5% to about 100% of radiation having a wavelength of between about 300 nm and about 700 nm, or even from about 40 to about 80% of radiation in that wavelength range. The thin films are also suitably capable of reflecting from about 1% to about 100% of radiation having a wavelength of between about 700 nm and about 2500 nm, preferably more than about 25% of such radiation. The thin films also suitably yield final products that have an emissivity of from about 75% to about 100% in the medium-IR ($\lambda > 2.5$ μm) range, or from about 85% to about 95% in that wavelength range.

The disclosed processes also include application of a sealant, a binder, an adhesive, and the like to the granule substrate, to the thin film, or to both to improve the mechanical or structural properties of the finished article. Clear or protective coatings may also be applied to the finished articles to impart additional durability to the finished articles. Methods of applying such coatings include, e.g., spraying and spin coating, and the optimal method for applying such a coating will be apparent to those of ordinary skill in the art.

The present methods also include preparation of the granule surface before disposition of the thin film atop the granule substrate. Such preparation may include, e.g., cleaning the granule substrate by washing, pressure washing, steam cleaning, and the like. Excess particles and foreign matter are typically removed before application of the thin films.

Construction granules made according to the claimed methods are also within the scope of the present invention.

Examples and Non-Limiting Embodiments

In one non-limiting embodiment of the present invention, films of $TiO_2$ were deposited on granules by dip coating a sol The sol was synthesized by adding 15.22 mL of titanium tetrabutoxide (97%; Aldrich, www.sigmaaldrich.com, St. Louis, Mo., USA) drop by drop to a mixture of 2.24 mL of acetyl acetone (99%; VWR Prolabo, www.fr.vwr.com, France) and 62.54 mL of isopropanol (VWR Prolabo, www.fr.vwr.com, France), followed by stirring for 1 hour.

About 30 g of granules were immersed into 15 mL of sol, after which the excess sol was drained and the granules were dried on filter paper. The resulting coated granules were then heat treated at different temperature.

The solar reflectance ("SR") as a function of the curing temperature was monitored according to the ASTM C-1549 method using a portable solar reflectometer (available from Devices & Services, Dallas, Tex.), with the following results:

| Temperature of thermal treatment | SR (%) | L* | a* | b* |
| --- | --- | --- | --- | --- |
| reference - granules | 6.4 | 30.0 | 6.6 | 7.3 |
| 400° C. | 9 | 38.8 | 6.8 | 5.6 |
| 500° C. | 11 | 39.9 | 8.4 | 6.2 |
| 600° C. | 14 | 40.3 | 8.8 | 6.2 |
| 800° C. | 20 | 40.4 | 9.1 | 7.1 |

Figure 4:
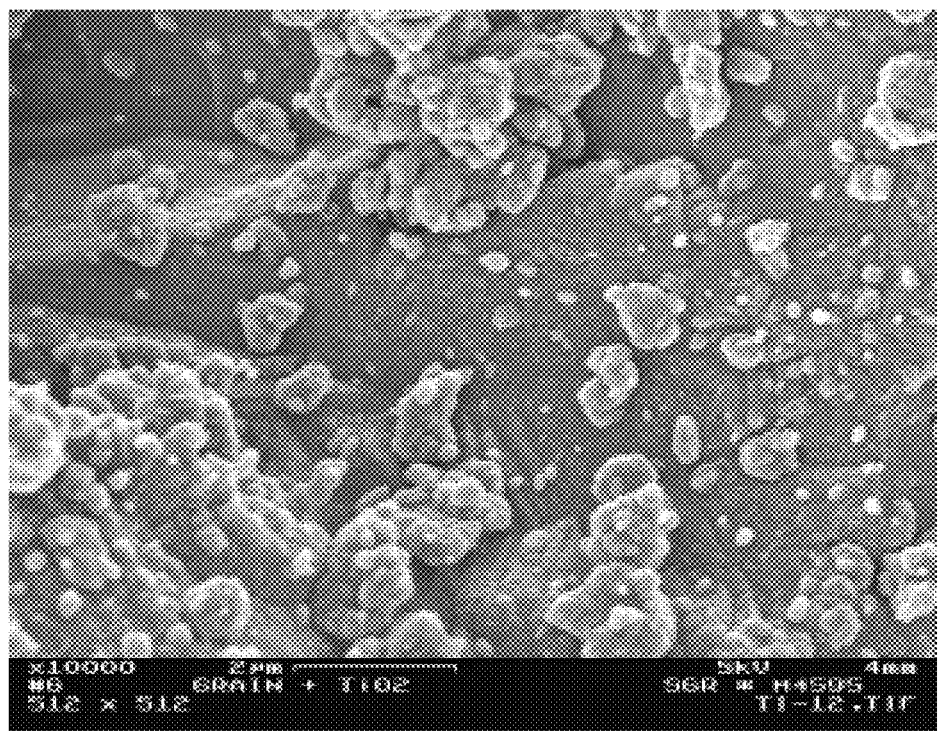
FIG. 4 illustrates scanning electron microscope (SEM) observations of a non-limiting population of granules with a CVD-applied $TiO_2$ coating.

In another non-limiting embodiment, a CVD process was used to deposit a reflective film on grains or granules. Granules with this coating are shown in FIG. 4 (coated grains). The size of the aggregates can, in some cases, reach about 1 micron, and the aggregates can increase the roughness of the grain surface. Without being bound to any particular theory, the light arriving at the surface of the coated grains may be reflected by the varying grain orientations (within the layer of $TiO_2$), and may also be scattered by the roughness of the coated grain surface.

Figure 3:
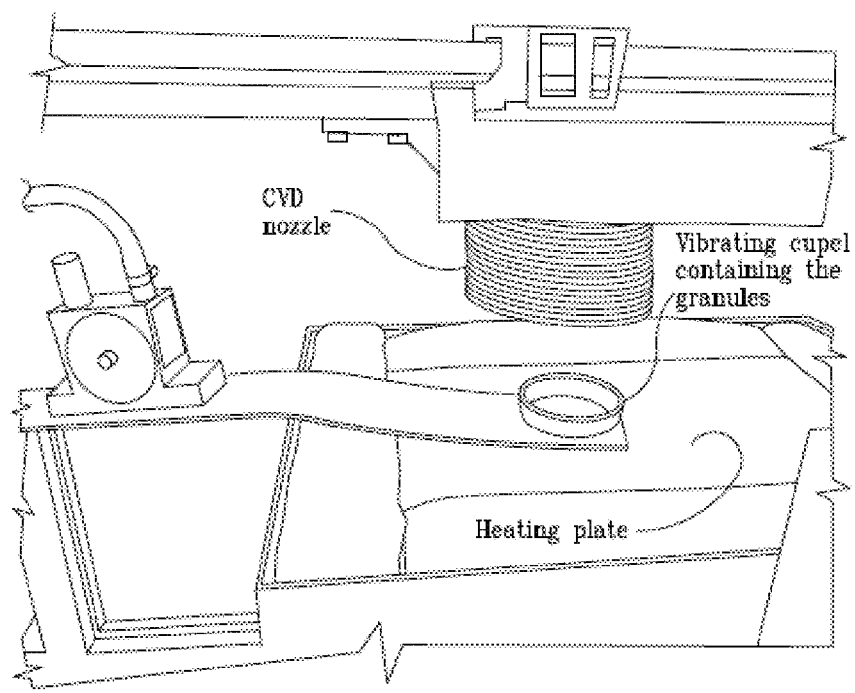
FIG. 3 illustrates an exemplary, non-limiting apparatus for placing a thin film on construction granules.

Also without being bound to any particular theory, the deposition system CVD-based deposition of films on grains, was to induce random rotative movements of the grains by vibration while the precursors are injected through a standard CVD nozzle, as shown in FIG. 3. CVD nozzles are known in the art.

In this non-limiting embodiment, a vibrating substrate holder was placed over a heating plate at 950° C. so as to achieve a grain temperature of about 400° C., at which temperature, deposition kinetics were controlled by the hot surface of the grain, resulting in a deposition that was homogeneous across the grain's surface. The vibration was set such that the grains remained in a cupel (shown in FIG. 3) while also being well-shaken. While it is not necessary that all grains be uniformly coated, it is preferable.

A $TiO_2$ layer was deposited by using titanium tetraisopropoxide (TIPT) as a precursor that was mixed with oxygen and nitrogen gas for dilution. The amounts of oxygen and nitrogen were fixed ($4.1 \times 10^{-2}$ mol/min and $2.9 \times 10^{-1}$ mol/min, respectively).

The amount of $TiO_2$ per grain was in the range of from about 0.001 to about 0.1 kg $TiO_2$ per kg of grain, with an estimated layer thickness of from about 100 nm to about 2 microns. This value was determined as follows:

$$\text{Amount of } TiO_2 \text{ per mass of grain} = \frac{\rho_{TiO2} \cdot \frac{4}{3} \cdot \pi[(r_{grain} + e_{layer})^3 - r_{grain}^3]}{\rho_{grain} \cdot \frac{4}{3} \cdot \pi \cdot r_{grain}^3}$$

Where the applicable units are kg of $TiO_2$ per kg of grain.
$\rho_{TiO2}$=4000 kg/m$^3$
$r_{grain}$=2.5·10$^{-4}$ m (average of the particle size distribution)
$e_{layer}$=1×10$^{-7}$ to 2×10$^{-6}$ m (STRATAGem software, SamX, www.samx.com, was used to provide an estimate of the layer thickness from the K-ratio (ratio of unknown intensity to reference intensity) that was obtained by quantifying the energy-dispersive spectroscopy (EDS) analysis; this measurement was well correlated with the grain cross section view.
$\rho_{grain}$=2000 kg/m$^3$ (estimated rock density).

In a first step, the duration of deposition varies for a given amount of TIPT. In a second step the amount of TIPT is increased.

The solar reflectance of the resulting, coated grains was measured. The solar reflectance is calculated according to the following formula:

$$SR = \frac{\int_{280}^{2500} R(\lambda) \cdot Ir(\lambda) \cdot d\lambda}{\int_{280}^{2500} Ir(\lambda) \cdot d\lambda}$$

where R is the reflection in %, $\lambda$ is the wavelength in nm and Ir (air mass) is the solar irradiance in units of W/m$^2$/nm.

A procedure was developed and validated to measure the reflection spectra of the granules. The light reflection is measured with a spectrometer (lambda 9, Perkin Elmer Co.) from 280 to 2500 nm. The grains were put in a transparent silica recipient with flat polished surfaces, known as a crucible). Silica was chosen because of its low absorption and reflection in the visible as well as in the near infra-red range (R=10%, T=88%, A=2%). Accordingly, the major part of the light reached the granules and was reflected back into the integrating sphere of the spectrometer. A black adhesive tape was placed on the second side of the crucible in order to avoid the reflection on the second surface of the crucible; the light could not pass through the grains because the thickness of compacted grains, in this embodiment, was about 5 mm.

Thus, the reference was the crucible with the black adhesive tape, but the tape itself had a small reflection that had to be removed. For each wavelength the reflectance was calculated with the following formula:

$R_{grains} = R_{crucible+grains} - (R_{crucible+black\ adhesive\ tape} - R_{black\ adhesive\ tape})$.

A calibration has been previously carried out between this method and the measurement with a commercial device Solar Spectrum Spectrometer (SSR). Without being bound to any particular theory, an additional correction was made so as to account for any, multireflection may have occurred between the grains and the glass of the crucible in which the grains are disposed.

Results from this non-limiting deposition method are shown below; these results are not to be construed as limiting any characteristic of the claimed invention.

| Sample | Deposit duration (min) | Solar Reflectance (SR) | L* | a* | b* | TiO$_2$ flow rate (mol/min) |
|---|---|---|---|---|---|---|
| Reference | 0 | 13.5 | 39.0 | 2.3 | 1.9 | 2.50 × 10$^{-4}$ |
| 1 | 6 | 15.6 | 42.7 | 2.2 | -0.3 | |
| 2 | 5 | 17.2 | 44.9 | 2.1 | -0.5 | |
| 3 | 10 | 26.5 | 52.0 | 2.0 | 4.5 | |
| 4 | 15 | 29.3 | 52.9 | 2.7 | 5.4 | |
| 5 | 20 | 33.5 | 56.3 | 2.2 | 7.0 | |
| 6 | 25 | 33.8 | 55.4 | 2.4 | 7.2 | |
| 7 | 20 | 32.8 | 57.7 | 1.6 | 4.1 | |
| 8 | 20 | 37.3 | 61.5 | 1.3 | 2.7 | |
| 9 | 20 | 33.8 | 57.4 | 2.0 | 5.2 | |
| 10 | 20 | 39.7 | 63.5 | 1.1 | 2.4 | |
| 11 | 40 | 46.4 | 67.9 | 0.9 | 2.1 | |
| 12 | 5 | 30.4 | 55.8 | 1.7 | 3.1 | 5.11 × 10$^{-4}$ |
| 13 | 10 | 34.0 | 58.6 | 1.7 | 3.6 | |
| 14 | 15 | 36.7 | 60.2 | 1.6 | 4.4 | |
| 15 | 20 | 37.2 | 61.1 | 1.5 | 3.3 | |

The $TiO_2$ deposited on the grains was anatase phase $TiO_2$, which material is known to have photocatalytic activity useful in, e.g., antimicrobial applications. Measurement of the color coordinates (L*, a*, b*) was performed by considering the CIE-1976 standard colorimetric observer and a D-65 illuminant, the observer and illuminant being of industry standards.

$TiO_2$ deposited on a grain can also be post-processed to give rise to a coating having enhanced reflectivity properties. As one non-limiting example, the coating may be heated (e.g., to 700, 800 or even 900° C.), which may give rise to rutile phase $TiO_2$, which material has different reflective properties and refractive index than the anatase $TiO_2$ initially deposited on the grains. In one non-limiting embodiment, heating of an exemplary coated grain to about 800° C. improved the solar reflectance (SR) value of the grain from about 26% to about 30%, an approximately 15% increase.

What is claimed:

1. A construction article comprising:
   a plurality of coated construction granules each having a separate, individual thin film coating,
   the thin film coating having a thickness in the range of from about 5 nm to about 5000 nm,
   the thin film coating transmitting from about 5% to about 100% of radiation having a wavelength of between about 300 nm and about 700 nm,
   the thin film coating reflecting from about 1% to about 100% of radiation having a wavelength of between about 700 nm and about 2500 nm.

2. The construction article of claim 1, wherein each of the coated construction granules has a solar reflectance of from about 9% to about 47%.

3. The construction article of claim 1, wherein the thin film coating transmits from about 25% to about 100% of radiation having a wavelength of between about 300 nm and about 700 nm.

4. The construction article of claim 1, at least one of the plurality of coated construction granules having an emissivity of from about 75% to about 100% of radiation having a wavelength of more than about 2500 nm.

5. The construction article of claim 1, wherein the thin film coating is adapted to reflect at least 50% of radiation having a wavelength of between about 700 nm to about 2500 nm.

6. The construction article of claim 5, wherein the thin film is adapted such that the plurality of coated construction granules has an L* value of less than about 68.

7. The construction article of claim 6, wherein the thin film is adapted such that the coated construction granule has an a* value in a range of about 0.9 to about 9.1, a b* value in a range of about −0.5 to about 5.6, or both.

8. The construction article of claim 1, wherein at least one granule of the plurality of coated construction has an outer surface completely surrounded by the thin film coating.

9. The construction article of claim 1, wherein the thin film coating completely surrounds the granule of each of the plurality of coated construction granules.

10. The construction article of claim 1, wherein the plurality of coated construction granules includes a plurality of granules each having an outer surface surrounded by a thin film coating.

11. The construction article of claim 10, wherein each of the plurality of coated construction granules is uniformly coated.

12. The construction article of claim 1, wherein the thin film coating is homogenous across the outer surface of the granule.

13. The construction article of claim 1, wherein at least one of the plurality of coated granules includes the thin film coating in an amount of from 0.1 parts by weight to about 10 parts by weight based on 100 parts by weight of the uncoated granule.

14. The construction article of claim 1, wherein each of the plurality of coated construction granules includes the thin film coating in an amount of from 0.1 parts by weight to about 10 parts by weight based on 100 parts by weight of the uncoated granule.

15. The construction article of claim 1, wherein the thin film coating transmits radiation having a wavelength of between about 300 nm and about 700 nm essentially uniformly across the range of wavelengths between about 300 nm and about 700 nm.

16. The construction article of claim 1, wherein the thin film coating is selected so as to provide a coated construction granule with an L* value of less than about 85.

17. The construction article of claim 1, wherein the thin film coating comprises a high-index material with a refractive index of at least about 1.5.

18. The construction article of claim 1, wherein the coated construction granule comprises an algaecidal agent, a biocidal agent, an antimicrobial agent, or any combination thereof.

19. The construction article of claim 1, wherein the article comprises a roofing material.

* * * * *